Jan. 23, 1945. I. JEPSON 2,368,026
TOASTER
Filed April 23, 1941 3 Sheets-Sheet 1
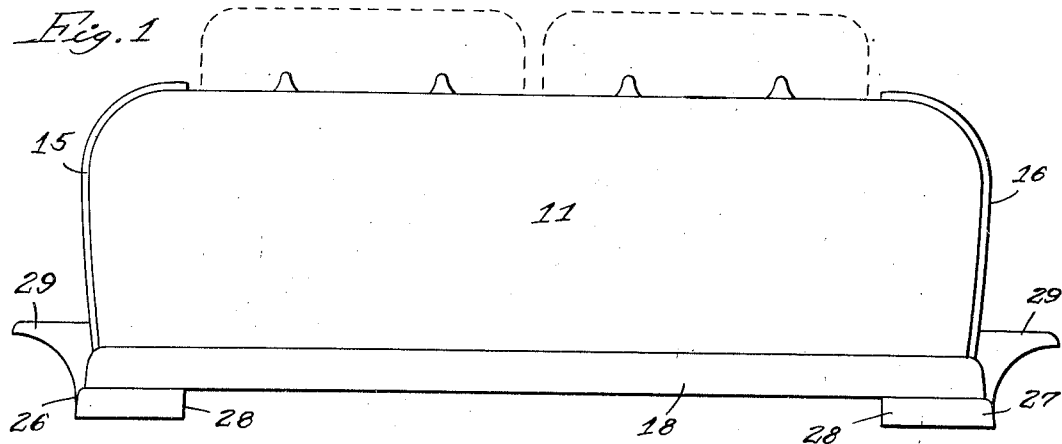
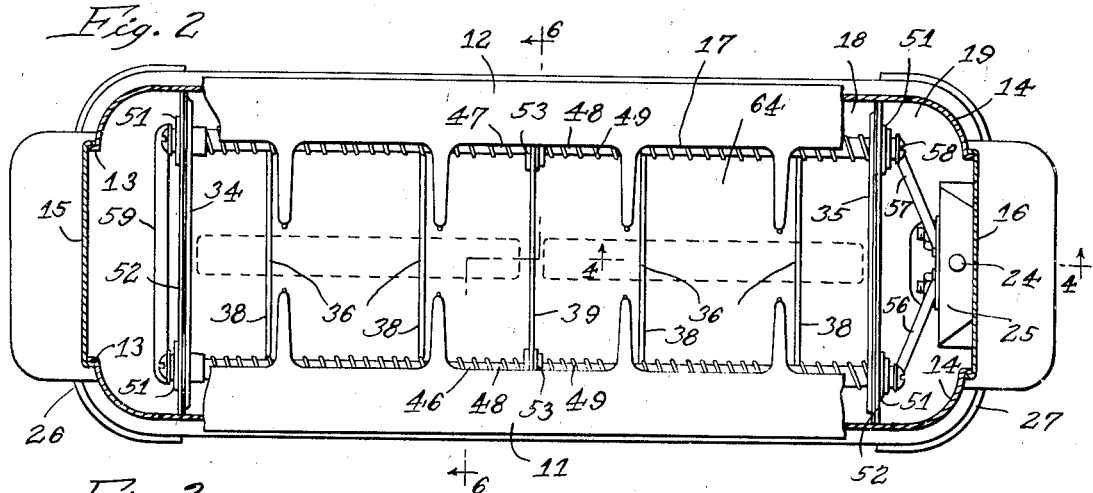
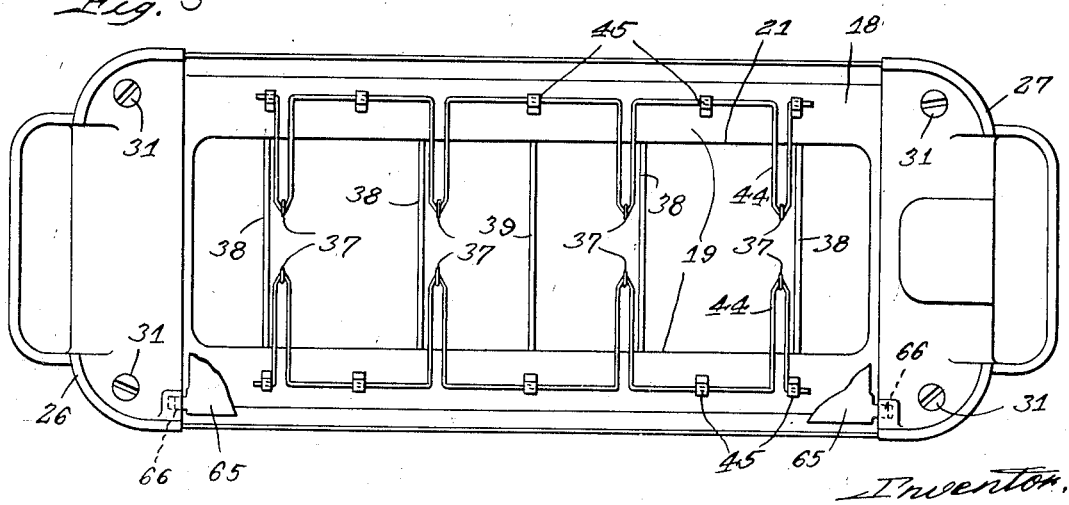
Inventor:
Ivar Jepson
By McCanna, Wintercorn & Morsbach
Attys.

Jan. 23, 1945.  I. JEPSON  2,368,026
TOASTER
Filed April 23, 1941  3 Sheets-Sheet 2
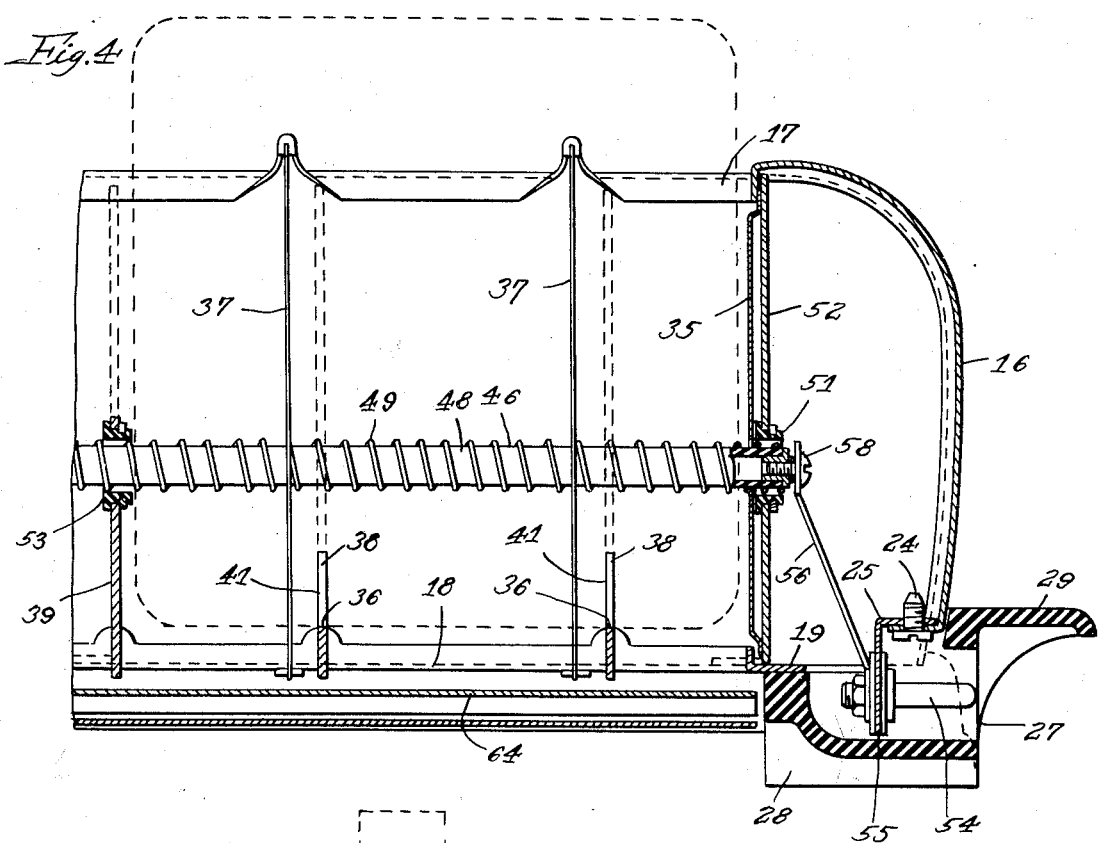
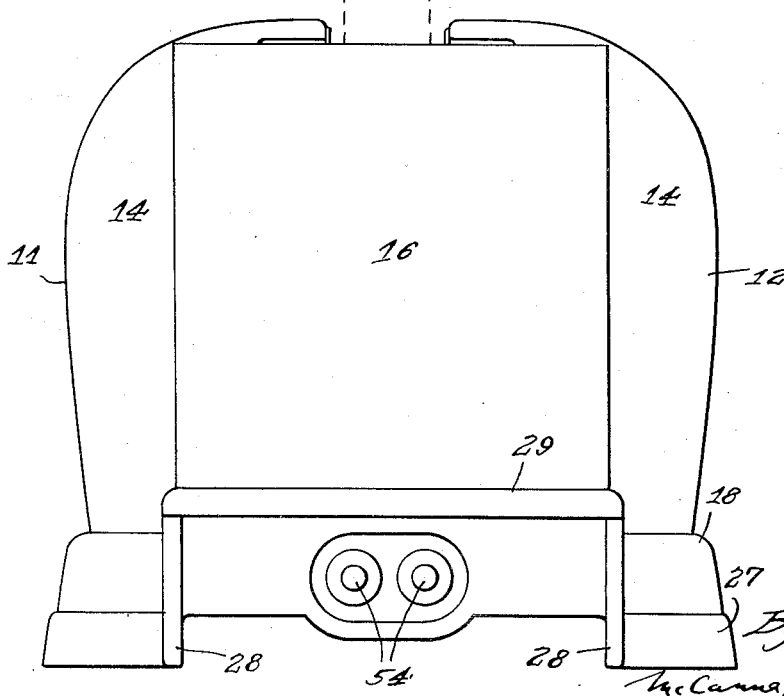
Inventor:
Ivar Jepson
By
McCanna, Winterson & Morsbach
Attys.

Jan. 23, 1945.  I. JEPSON  2,368,026
TOASTER
Filed April 23, 1941  3 Sheets-Sheet 3
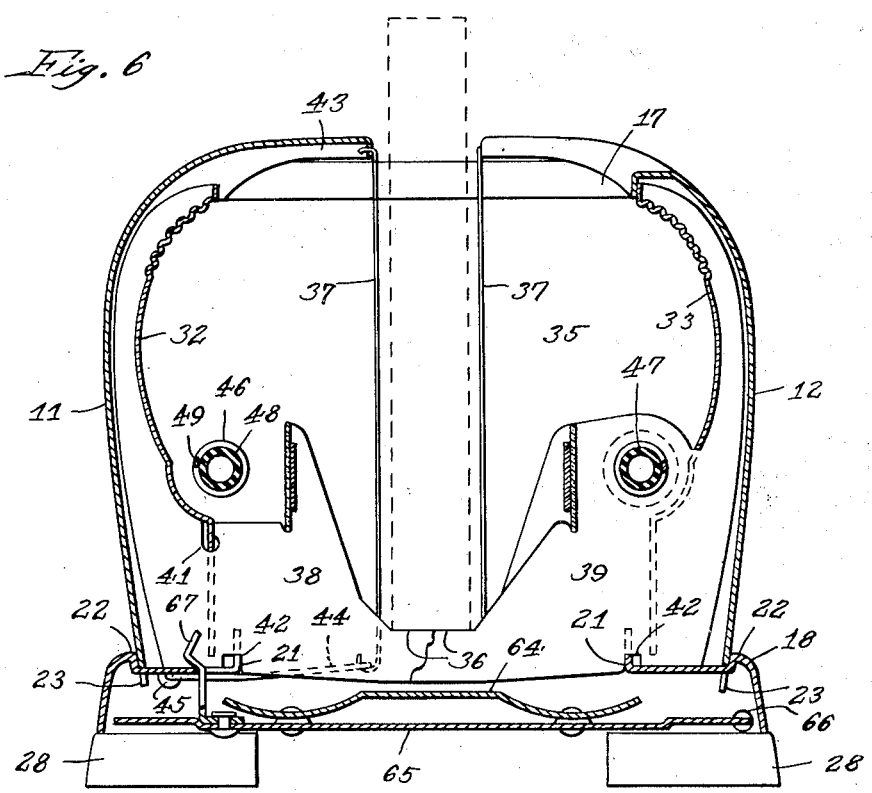
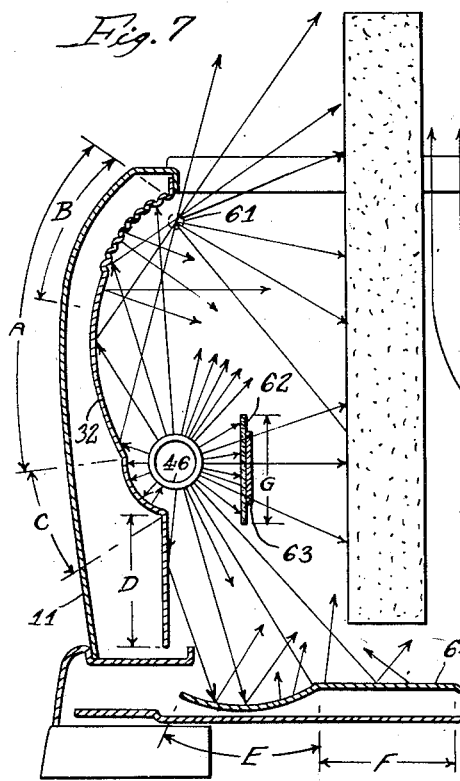
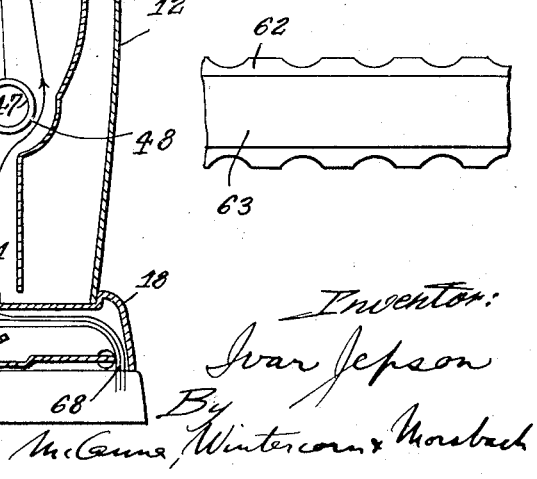

Patented Jan. 23, 1945

2,368,026

UNITED STATES PATENT OFFICE 2,368,026

TOASTER

Ivar Jepson, Chicago, Ill., assignor to Chicago Flexible Shaft Company, Chicago, Ill., a corporation of Illinois Application April 23, 1941, Serial No. 389,916

7 Claims. (Cl. 99—389)

This invention relates to toasting slices of bread, preferably in an electric toaster adapted for home use.

Heretofore toasters of this type have included more or less complicated structures for moving the bread slice or slices into and out of a toasting position or relation to the heating means, or for relatively moving a bread support and the heating means between an initial bread receiving position and a toasting position or between a toasting position and an ejecting position. In such prior structures the bread was toasted in a substantially closed compartment and the used had to perform some kind of manual operation to move the bread support to the toasting position or withdraw it from the toasting position in order to see or determine the progress of the toasting, or automatic mechanism was provided to determine the toasting period or eject the toast at the end of a time period. Invariably these relatively movable bread supports and heating means were coordinated with spring-loading devices, latch devices and lever mechanisms for effecting the relative movements either before or after the toasting operation, or both.

One of the objects of the present invention is to eliminate the complications of such relatively movable bread supports and heating means by the provision of a novel toaster structure in which the bread support and the heating means are always in fixed relative relation and the bread slice is dropped by hand into a toasting position and is removed by hand, and in which the opposite sides of the bread slice are always exposed to view so that the degree of toasting is easily visible and the slice may be removed at any time simply by picking it up.

Another object of the invention is to so support the bread slice that a substantial upper portion of the slice extends out of the tosater through a wide open top thereof for the purpose of exposing the sides of the slices to convenient vision while the toasting operation is in progress and also for the purpose of affording means for easily removing the slice by hand.

Another object of the invention is to provide means for distributing heat substantially evenly over the whole surface of each side of the slice when the latter is supported with its top portion extending out of the toaster proper as described, whereby to obtain an even degree of toasting over each side.

I have also aimed to provide a toaster of such improved operating characteristics as to permit of manufacture at a comparatively low cost.

Other objects and attendant advantages will be appreciated by those skilled in this art as the invention becomes better understood by reference to the following description when considered in connection with the accompanying drawings, in which Figure 1 is a side elevation of a toaster embodying my invention;

Fig. 2 is a plan view of the toaster with the end portions in horizontal section;

Fig. 3 is a bottom view of the toaster with the crumb and bottom trays removed except for showing the hinging of the bottom tray;

Fig. 4 is an enlarged vertical section taken substantially on the section line 4—4 of Fig. 2;

Fig. 5 is an end view elevation looking at the right hand end of Fig. 4;

Fig. 6 is a cross section taken substantially on the section line 6—6 of Fig. 4;

Fig. 7 is a diagrammatic view in the nature of a cross section through the toaster; and Fig. 8 is a fragmentary side elevation of one of the baffle elements, removed from the toaster.

In the drawings I have shown my invention as applied to a two-slice toaster but it should be understood that in its broader phase it is applicable to a single slice toaster or to more than two slices. My invention is characterized by the provision of means for transmitting heat to opposide sides of a slice of bread to toast the same evenly while the slice is supported in a bread compartment with a substantial portion of the slice extending through a wide opening at one side of the compartment, preferably at the top. According to my invention the bread support and the heat transmitting means are in fixed relative relation at all times, thus eliminating the more or less complicated structures of the prior art which are designed for the express purpose of effecting such relative movements. With this in view my invention provides a bread compartment having a relatively wide open top and means for supporting a slice of bread centrally within the compartment with a substantial portion of the slice projecting above the open top. This leaves a large portion of the slice in extended position so that it may be conveniently grasped for removing and inserting. The high projection of the slice, together with the wide open top, affords a relatively wide angle vision so that the toasting surfaces are visible by convenient inspection. The heat transmitting means includes heating elements coacting with reflector elements in a novel manner to transmit heat rays to both sides of the slice to effect uniform toasting, this imposing a difficult problem in view of the comparatively large portion of the slice projecting from the bread compartment.

In the two-slice embodiment here shown the slices of bread are adapted to be supported in substantially end-to-end relation in a vertical plane centrally within a bread compartment with both slices projecting above the wide open top of such compartment. The casing forming the compartment may be of any suitable or preferred construction, although my invention provides a novel structure. This comprises an outer casing structure and an inner heat transmitting structure including reflector elements. The outer casing is composed of duplicate sides designated generally by 11 and 12 each having a transverse curvature, shown best in Figs. 5 and 6, and turned in at its ends to provide end walls 13 and 14 having a curvature somewhat similar but with more pronounced overhang at the top than the side walls. Upright end bands 15 and 16 fit over the out-turned flanges at the inner ends of the side walls and serve to clamp the side walls making a continuous outer casing. The outer casing structure provides a relatively wide and long open open top 17 for toasting vision and for unrestricted access of the fingers to the opposite sides of a bread slice when placing a slice in the toasting position and removing it therefrom. This casing structure seats on a base plate designated generally by 18, the cross sectional shape of which is best shown in Fig. 6, having a horizontal portion 19 at the sides and ends of a rectangular opening 21 conforming in outline but somewhat smaller than the opening 17. The base plate has peripheral upstanding bead 22 which serves for location of the casing sides and these sides are further located by projections 23 which enter openings in the base plate, as shown in Fig. 6. The casing is detachably held in position on the base plate by screws 24, one at each end, serving to connect an in-turned portion of the end band to a pressed-up portion 25 of the adjacent base plate, as shown in Figs. 2 and 4. The base plate is supported at each end on Bakelite blocks designated generally by 26 and 27, each shaped to provide supporting legs 28 and a handle 29, and each block being attached to the base plate by screws 31 applied from the bottom as shown in Fig. 3.

The bread compartment is defined by side wall reflectors designated generally by 32 and 33, end wall reflectors 34 and 35, a bottom structure which will be presently described, and the wide open top 17 above mentioned.

The bread slices may be inserted or dropped vertically by hand into the compartment through the top thereof until they rest on stationary supports 36. Vertical guide wires 37 serve to guide and give lateral support to the slices. Other forms of bread supports may, however, be used. In this instance the supports 36 are formed by a pair of transverse plates 38 for each slice. These transverse plates 38, together with a centrally located transverse plate 39, extend entirely across the bread compartment and are shaped to extend upwardly at their outer ends between the casing side walls and the side reflectors and to conform to the outer shape of the latter. These transverse plates are preferably united to the side reflectors at points vertically thereon so as to constitute a unitary side reflector structure with the reflector walls reinforced and held against distortion or displacement by the horizontally and vertically extending transverse plates. In this instance the side reflectors are slotted from the bottom as at 41 to receive the transverse plates and the reflector unit is located at the bottom by slots 42 interfitting with the flanges 21 on the base plate and at the top by engagement with the downturned flange of the opening 17, as shown in Fig. 6.

The vertical guides 37 are preferably of stainless steel wire held under tension lengthwise so as to take up linear expansion when heated. In this instance each wire is anchored at its upper end to a narrow arm 43 fixed to or integral with the casing side walls 11 and 12 and extending into the open top of the bread compartment, and each wire is hooked at its lower end to a spring member 44 which is so shaped and fastened at 45 to the underside of the base plate as to be under tension constantly exerting a downward pull on the guide wires.

In the preferred embodiment only a single heating element is used at each side of the bread for producing heat which is to be transmitted to the adjacent sides of both slices for toasting the same. The heating elements designated generally by 46 and 47 each comprise a supporting core 48, in this instance in the form of a tube of insulation material, and a resistance wire 49 wound on the tube, these elements being supported at their ends in porcelain ferrules 51 in turn supported on end plates 52 and at an intermediate point by a ferrule 53, in this instance supported on the central transverse plate 39. The heating elements are connected in series, electric current being supplied by any suitable means, in this instance through terminals 54 adapted for an ordinary plug connector. As shown in Fig. 4, these terminals are supported on the vertical portion 55 pressed out from the base plate portion 19 and are connected by leads 56 and 57 to the heating elements 46 and 47 by means of screw connections 58, the heating elements being connected at the opposite ends by a conductor 59. In this case the heating elements burn continuously when the toaster is plugged in; but it should be understood that my invention in its broader aspect is adapted for use with any suitable or preferred control for the heating elements whereby to automatically or otherwise terminate the toasting operation at a predetermined time. In other words, my invention is adapted for use with automatic controls which serve to terminate the toasting operation at a predetermined time. In either case, however, the progress of the toasting operation is visible at all times and the bread slice may be instantly and conveniently removed at will.

My invention provides means coacting with the heating elements to transmit heat evenly over the whole surface of each side of the slice or slices so as to produce substantially uniform toasting over the entire areas. The embodiment here shown is as follows: Since the heat transmitting means at each side of the slice is identical the description will refer in detail to the heating element 46 and the side reflector 32 and the diagrammatic showing in Fib. 7. The side reflector is composed of sections designated A, B, C and D. Section A is an ellipsoidal reflector so shaped and arranged with relation to the heating element 46 that the majority of heat radiated to it by the element will be concentrated at an upper location 61 from which it fans out to a relatively wide spread over a major length of the adjacent side of the slice, as indicated diagrammatically by the arrows in this view. In order to modify the heat intensity from the location 61 the upper section B of the reflector section A is given a hammered finish (shown diagrammatically and exaggerated in the drawings) or a diffusing surface by other methods such as sandpapering, pickling, and the like. This decreases the concentration of heat at such portions by deflecting some of the heat in other directions. The section C is concentric with the heating element with the result that heat waves from the element received by this section of the reflector are directed back into the element, which tends to increase the temperature of the element and in this way conserve this section of the heat which would be otherwise wasted insofar as concerns its application for toasting. Section D is used to direct heat to the bottom surface of the bread slice. The heat waves are directed from the element to the reflector D from which they are reflected downwardly to bottom reflector sections E and F and from the latter up to the bread. Reflector sections E and F also receive heat directly from the element and these rays are reflected back into the toasting compartment and against the bread. With this embodiment the heat rays emanating from the portion of the element closest to the bread surface are baffled and absorbed to a limited degree by means of a baffle in the section designated G, such baffle being desirable particularly when the heating elements and reflectors are engaged closer to the bread slices. Such baffle effect may be obtained by different means. In this case I have used a baffle of mica of varying thickness and shape proportional to the intensity of the rays comprising sheets 62 and 63, sheet 63 being slightly thicker than sheet 62, and sheet 62 having irregular upper and lower edges substantially as shown in Fig. 8. This material absorbs a certain percentage of the radiating rays. Another method is to use a perforated material which would allow a certain percentage of heat proportional to the area of the perforations to penetrate through to the bread slice. The reflector sections E and F are in this instance formed by a plate 64 which serves also as a crumb tray and is fastened to a bottom plate 65 which in turn is hinged at 66 to the end blocks 26 and 27. The plate 65 constitutes a bottom cover which may be swung downwardly for cleaning and is normally retained in the position shown by a spring latch 67, Fig. 6. The crumb tray 64 is supported in spaced relation to the bottom plate 65 so as to provide air space therebetween to minimize heat loss. As shown diagrammatically at the right in Fig. 7, these bottom plates 64 and 65 are so arranged as to provide a limited air inlet 68 permitting air flow through the bread compartment substantially as indicated by the arrows, thus allowing convected heat to be carried to the upper portion of the adjacent surface of the bread. The side reflectors 32 and 33, as well as the bottom reflector formed by the crumb tray 64 and the end plates 35 are of material having high heat reflective characteristics and relatively low emissivity or radiating power. For practical purposes I have used aluminum reflectors. The reflecting surfaces may be given an electrolytic treatment to improve the brightness and permanence of the surface, but this is not essential. It is important, however, to the efficiency of the toaster that the walls defining the bread compartment shall be of a material having high reflectivity. The aluminum plates also act as insulators and prevent undue absorption of heat by the outer steel casing structure.

In the operation of the toaster heat is transmitted to the surfaces of the bread for toasting by means of direct radiation, reflected radiation, and by convection, and I have provided means whereby this heat is so transmitted as to produce a substantially uniform toasting effect over the entire side surfaces of the bread even though a substantial portion of the slice or slices is disposed outside of the bread compartment or beyond the structural confines of the casing which constitutes the bread compartment proper and contains the heat transmitting means.

My invention in its broader aspect should not be limited to the particular form of the heat transmitting means herein disclosed but contemplates broadly the provision of any equivalent means for this purpose.

It will be observed that my invention provides a toaster intended for toasting bread slices from an average loaf of the kind most generally sold for home consumption in this country. It is found that the bread loaf sizes sold to this market range from three quarters of a pound to a pound and one half with the most common size being a pound loaf which is generally regarded as a standard loaf. It is customary to sell these loaves sliced or unsliced; and by ordinary or average slice is meant one of this kind which is similar to what is used in the average home for making toast. My invention is primarily intended for this market. It will be manifest, however, that if my invention is applied to bread slices of sizes materially different from the average herein described, the toaster would be proportionately designed in accordance with the teachings hereof to perform the functions of the invention.

The ornamental design of the toaster herein disclosed is the invention of George T. Scharfenberg claimed in a separate application for design Letters Patent.

I claim:

1. A toaster comprising a base, reflector side walls and reflector end walls supported on the base defining a toasting compartment, the side walls being spaced apart at the top to provide a relatively wide opening for the reception and removal of a bread slice therethrough, means for supporting a bread slice in a toasting position with the major portion of the slice disposed within said compartment in a vertical position centrally with respect to said top opening and with a minor portion projecting through and beyond said opening, whereby said minor portion may be taken hold of by the hand for placing the bread slice in said toasting position and for removing it therefrom, vertical guide wires in said compartment for providing lateral support to a bread slice in said toasting position, an outer casing on the base enclosing said reflector walls and having a top opening conforming with that provided by the reflector walls, the casing having narrow arms extending inwardly into its said top opening and providing support for the upper ends of said guide wires, and a heating element in the compartment opposite each side of the bread slice consisting of a rod of insulation material supported at its ends on the end wall reflectors and a coil of resistance wire supported on each rod, said side wall reflectors being shaped in coaction with said heating elements for distributing heat through said compartment and through said top opening to the opposite sides of the bread slice for toasting the same.

2. In a toaster in combination, a casing providing a bread compartment having a relatively wide open top, means for supporting a slice of bread in a vertical plane centrally in said compartment with a substantial portion of the slice projecting above said open top, a small diameter coil type heating element in the compartment opposite each side of the slice extending parallel therewith for radiating heat in all directions, heat transmission means opposite each side of the slice comprising an ellipsoidal reflector at the side of the heating element remote from the slice extending from the open top into proximity to the heating element and arranged for reflecting radiating heat waves to the adjacent side of the slice and to that portion of the slice which extends above the open top, and a vertically disposed baffle interposed between each heating element and the slice to intercept some of the heat which would otherwise be directed to the slice, said interception of heat being in co-relation with the direct radiating heat waves from the heating element and the reflected radiating heat waves from the reflector to effect substantially even heat transmission over the whole surface of the slice.

3. In a toaster, in combination, a compartment permanently closed at its sides and having a permanently open top opening into which a bread slice is adapted to be inserted to a toasting position and from which it is adapted to be removed after toasting, means for supporting the bread slice in said toasting position without carrier means for moving the slice to or from said toasting position, said toasting compartment and said slice supporting means constructed and arranged so that a bread slice from an average loaf sold for home consumption will be supported in said toasting position with a major portion of the slice disposed within said compartment and with a substantial minor portion projecting through said top opening, and means within the compartment constructed and arranged to effect substantially uniform toasting of the opposite sides of the slice while it is supported in said toasting position, the heating elements of said toasting means being located substantially below said top opening, said top opening being of substantial width extending substantially beyond opposite sides of the slice in said toasting position to provide unrestricted access of the fingers into the top portion of the toasting compartment at the opposite sides of the slice when inserting a hand held slice to said toasting position and removing it therefrom.

4. A toaster for toasting average sized bread slices comprising a casing structure having permanently closed side walls and end walls enclosing a toasting compartment, the casing structures having a permanently open top providing access to the toasting compartment, means for supporting a bread slice in an upright toasting position in said toasting compartment with a substantial upper portion of the slice projecting through said top opening, said bread supporting means comprising a stationary support in the bottom of the toasting compartment and vertical guide wires extending from the bottom support to the top opening providing lateral support for the bread slice, said top opening being of a width extending substantially beyond the outer sides of said guide wires and said upper portion of the slice being so projected as to permit unrestricted insertion of the fingers into said top opening to grasp the opposite sides of the slice for inserting it to the toasting position and for removing it after toasting whereby to eliminate the provision of bread carrier means for moving the bread slice to and from the toasting position, and means within the casing structure and beneath said top opening for toasting the opposite sides of the bread slice while it is supported in said toasting position including heating elements and means arranged in coaction with the heating elements to cause heat therefrom to be distributed over the entire surface at each side of the bread slice in a manner to effect substantially uniform toasting thereof when said slice is supported in said toasting position.

5. A toaster for toasting average size bread slices comprising a casing structure having permanently closed side walls and end walls enclosing a toasting compartment, the casing structure having a permanently open top providing access to the toasting compartment, means for supporting a bread slice in an upright toasting position in said toasting compartment including a stationary support in the bottom of the toasting compartment positioning the bread slice with a substantial upper portion thereof projecting through and above said top opening, said top opening being of a width more than half the depth of the toasting compartment measured from said bottom support whereby to permit unrestricted insertion of the fingers into said opening to grasp the opposite sides of the slice for inserting it to the toasting position and for removing it after toasting and whereby to eliminate the provision of bread carrier means for moving the bread slice to and from the toasting position, and means within the casing structure and beneath said top opening for toasting the opposite sides of the bread slice while it is supported in said toasting position including heating elements and means arranged in coaction with the heating elements to cause heat therefrom to be distributed over the entire surface at each side of the bread slice in a manner to effect substantially uniform toasting thereof when said slice is supported in said toasting position.

6. A device for toasting bread slices from an average loaf sold for home consumption comprising an enclosed toasting compartment having a relatively wide top opening for the reception and removal of a bread slice therethrough, means for supporting a bread slice in a toasting position without a carrier for moving the bread slice to and from said toasting positions, with the major portion of the slice disposed within said compartment in a vertical position centrally with respect to said top opening and with a substantial minor portion projecting through and beyond said opening, whereby said minor portion may be taken hold of by the hand for placing the bread slice in said toasting position and for removing it therefrom, and means within said compartment for distributing heat through said compartment and through said top opening to the opposite sides of the bread slice to effect substantially uniform toasting of both said major and minor portions while the slice is supported in said toasting position, the bread slice supporting means including vertical wires defining the toasting position and adapted to provide lateral support for a bread slice, and the upper end of each wire being anchored to the inner end of a narrow arm extending inwardly from the adjacent side of the toasting compartment.

7. A device for toasting bread slices from an average loaf sold for home consumption comprising an enclosed toasting compartment having a relatively wide top opening for the reception and removal of a bread slice therethrough, means for supporting a bread slice in a toasting position without a carrier for moving the bread slice to and from said toasting position, with the major portion of the slice disposed within said compartment in a vertical position centrally with respect to said top opening and with a substantial minor portion projecting through and beyond the plane of said opening, whereby said minor portion may be taken hold of by the hand for placing the bread slice in said toasting position and for removing it therefrom, and means within said compartment for distributing heat to the opposite sides of the bread slice substantially uniformly over the side surfaces of both said major and minor portions while the slice is supported in said toasting position, including a heating element in the compartment opposite each side of the bread slice arranged to supply direct radiated heat unevenly over the adjacent side surface of the bread slice, and reflector surfaces defining the side walls of the compartment opposite from the sides of said major portion of the slice, said reflector surfaces arranged in coaction with the heating elements to supply reflected heat therefrom in such manner that the sum of the direct radiated heat from the heating elements and the reflected heat from the reflector surfaces is approximately constant for each portion of the entire surface at each side of the slice, each heating element comprising a single coil of resistant wire extending horizontally, parallel with the bread slice for radiating heat in all directions from the center of the element, the reflector surfaces comprising an arcuate surface concentric with each coil and positioned in a sector beneath and at the side of the heating element remote from the bread slice, a reflector surface extending downwardly from the lower end of said arcuate surface, and a reflector surface of general ellipsoidal form extending upwardly from the upper end of said arcuate surface.

IVAR JEPSON.